(12) United States Patent
Yu et al.

(10) Patent No.: US 10,666,859 B2
(45) Date of Patent: May 26, 2020

(54) SELF-PHOTOGRAPHING CONTROL METHOD AND DEVICE, AND ELECTRONIC DEVICE

(71) Applicant: BOE Technology Group Co., Ltd., Beijing (CN)

(72) Inventors: Yue Yu, Beijing (CN); Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/240,959

(22) Filed: Jan. 7, 2019

(65) Prior Publication Data
US 2019/0320112 A1  Oct. 17, 2019

(30) Foreign Application Priority Data

Apr. 13, 2018  (CN) .......................... 2018 1 0331954

(51) Int. Cl.
*H04N 5/232*  (2006.01)
*G06K 9/00*  (2006.01)

(52) U.S. Cl.
CPC ..... *H04N 5/23219* (2013.01); *G06K 9/00255* (2013.01); *H04N 5/23222* (2013.01)

(58) Field of Classification Search
CPC ........... H04N 5/23219; H04N 5/23222; G06K 9/00255; G06K 9/0059; G06K 9/00597–00617; G06K 9/00221–00389
See application file for complete search history.

(56) References Cited

U.S. PATENT DOCUMENTS

| 5,859,921 | A | * | 1/1999 | Suzuki | G06K 9/00268 |
| | | | | | 382/118 |
| 8,174,567 | B2 | * | 5/2012 | Lee | H04N 5/23219 |
| | | | | | 348/207.99 |
| 10,049,271 | B2 | * | 8/2018 | Tsou | G06F 3/0304 |
| 2005/0105827 | A1 | * | 5/2005 | Yonaha | G06K 9/4633 |
| | | | | | 382/291 |
| 2011/0261182 | A1 | * | 10/2011 | Lee | A61B 5/1079 |
| | | | | | 348/77 |
| 2014/0240483 | A1 | | 8/2014 | Lee | |
| 2014/0333748 | A1 | * | 11/2014 | Kim | G06K 9/00604 |
| | | | | | 348/78 |
| 2015/0229837 | A1 | | 8/2015 | Her et al. | |

(Continued)

FOREIGN PATENT DOCUMENTS

| CN | 101739548 A | 6/2010 |
| CN | 101908140 A | 12/2010 |

(Continued)

OTHER PUBLICATIONS

First Office Action with English language translation, CN Application No. 201810331954.9, Dec. 17, 2019, 14 pp.

*Primary Examiner* — Abdelaaziz Tissire
(74) *Attorney, Agent, or Firm* — Myers Bigel, P.A.

(57) ABSTRACT

A self-photographing control method, a self-photographing control device and an electronic device are provided. The self-photographing control method includes the steps of acquiring a first original image, selecting a human eye from the first original image as a main eye for controlling photographing, acquiring an action of the main eye, and triggering a photographing operation if the action of the main eye meets a set condition.

17 Claims, 10 Drawing Sheets

(56) References Cited

U.S. PATENT DOCUMENTS

| | | | |
|---|---|---|---|
| 2015/0256741 A1* | 9/2015 | Towal | H04N 5/23219 348/222.1 |
| 2017/0094159 A1* | 3/2017 | Priesum | H04N 5/23293 |
| 2017/0118403 A1* | 4/2017 | Chu | G06K 9/00604 |
| 2017/0163866 A1* | 6/2017 | Johnson | H04N 5/23203 |
| 2018/0365844 A1* | 12/2018 | Cai | G06T 7/248 |

FOREIGN PATENT DOCUMENTS

| | | |
|---|---|---|
| CN | 102799277 A | 11/2012 |
| CN | 104468995 A | 3/2015 |
| CN | 104516489 A | 4/2015 |
| CN | 104836889 A | 8/2015 |
| CN | 105827972 A | 8/2016 |
| CN | 107396170 A | 11/2017 |
| CN | 107479695 A | 12/2017 |
| CN | 107844780 A | 3/2018 |

\* cited by examiner

SELF-PHOTOGRAPHING CONTROL METHOD AND DEVICE, AND ELECTRONIC DEVICE

CROSS REFERENCE TO RELATED APPLICATIONS

The present application claims the benefit of a Chinese patent application No. 201810331954.9 filed on Apr. 13, 2018, the entire disclosure of which is incorporated herein by reference.

TECHNICAL FIELD

The present disclosure relates to the technical field of image processing, in particular to a self-photographing control method, a self-photographing control device and an electronic device.

BACKGROUND

At present, in the process of self-photographing, a user will use a blink of an eye to realize self-photographing. However, in the case of multi-person selfie, as long as one person blinks, it will take photos by mistake, resulting in a poor self-photographing experience.

SUMMARY

The present disclosure provides a self-photographing control method, a self-photographing control device and an electronic device to solve the defects in the related technology.

According to a first aspect of an embodiment of the present disclosure, it is provided a self-photographing control method, the method comprising the steps of:

acquiring a first original image;

selecting a human eye from the first original image as a main eye for controlling photographing;

acquiring the action of the main eye;

if the action of the main eye meets a set condition, triggering the photographing operation.

Optionally, selecting a human eye from the first original image as the main eye for controlling photographing comprises:

processing the first original image to obtain at least one human face image;

processing the at least one human face image to obtain at least one human eye image;

selecting a human eye from the at least one human eye image as the main eye.

Optionally, processing the at least one human face image to obtain the at least one human eye image comprises:

performing a first preprocessing on each human face image in the at least one human face image, wherein the first preprocessing comprises grayscale processing and normalization processing;

determining a center position of each human eye by an integral projection method and a differential projection method for each human face image after the first preprocessing;

generating a rectangular frame with a set size based on the center position of each human eye, wherein an image in the rectangular frame is the human eye image.

Optionally, determining the center position of each human eye using the integral projection method and the differential projection method for each human face image after the first preprocessing comprises:

determining the abscissa of the center position of the human eye in the human eye image by a vertical integral projection method;

determining an iris region of a human eye in the human eye image by a horizontal differential projection method;

determining the ordinate of the line with the smallest sum of the gray values of the image in the iris region by the horizontal integral projection method to obtain the ordinate of the center position of the human eye.

Optionally, selecting a human eye from the at least one human eye image as the main eye comprises:

determining the number of the at least one human eye image;

if the number of the at least one human eye image is multiple, performing a second preprocessing on the image in the rectangular frame, wherein the second preprocessing comprises at least binarization processing, corrosion processing and dilation processing;

acquiring the area of the connected domain in each rectangular frame;

determining the human eye in the rectangular frame corresponding to the connected domain with the largest area as the main eye;

if the number of the at least one human eye image is one, determining the human eye in the rectangular frame as the main eye.

Optionally, the action of acquiring the main eye comprises:

acquiring a plurality of second original images, wherein the plurality of second original images are images captured sequentially after the first original image;

as for each second original image in the plurality of second original images, acquiring the area of the connected domain in the rectangular frame corresponding to the main eye in each second original image;

determining that the main eye is in a closed state if the area of the connected domain in the rectangular frame corresponding to the main eye is less than or equal to an area threshold;

based on the closed state of the main eye in the plurality of second original images, determining the closing time of the main eye or the closing times of the main eye in a set time period to obtain the action of the main eye.

Optionally, before acquiring the area of the connected domain in the rectangular frame corresponding to the main eye in each second original image, the method further comprises:

acquiring the center position of the human eye in the rectangular frame in each second original image;

if the distance between the center position of the human eye in each second original image and the center position of the main eye is less than or equal to a distance threshold, determining the human eye in each second original image as the main eye.

Optionally, the set condition is that the number of times the main eye is closed exceeds a set number of times within a set time period or the closing time of the main eye exceeds a closing time threshold.

According to a second aspect of an embodiment of the present disclosure, it is provided a self-photographing control device, the device comprising:

a first image acquisition module configured to acquire a first original image;

a main eye selection module configured to select a human eye from the first original image as the main eye for controlling photographing;

an action acquisition module configured to acquire actions of the main eye;

a photographing trigger module configured to trigger photographing operation when the action of the main eye meets the set condition.

Optionally, the main eye selection module comprises: a human face image acquisition submodule configured to process the first original image to obtain at least one human face image;

a human eye image acquisition submodule configured to process the at least one human face image to obtain at least one human eye image;

a main eye selection submodule configured to select a human eye from the at least one human eye image as the main eye.

Optionally, the human eye image acquisition submodule comprises:

a first preprocessing unit configured to perform a first preprocessing on each human face image in the at least one human face image, wherein the first preprocessing comprises grayscale processing and normalization processing;

a human eye center determination unit for determining the center position of each human eye by an integral projection method and a differential projection method for each human face image after the first preprocessing;

a human eye image acquisition unit for generating a rectangular frame with a set size based on the center position of each human eye, wherein the image in the rectangular frame is a human eye image.

Optionally, the human eye center determination unit comprises:

an abscissa determination subunit for determining the abscissa of the center position of the human eye in the human eye image by a vertical integral projection method;

an iris region determination subunit for determining an iris region of the human eye in the human eye image by a horizontal differential projection method;

an ordinate determination subunit for determining the ordinate of the line with the smallest sum of the gray values of the images in the iris region by a horizontal integral projection method to obtain the ordinate of the center position of the human eye.

Optionally, the main eye selection submodule comprises: a human eye number determination unit for determining the number of the at least one human eye image;

a second preprocessing unit configured to perform a second preprocessing on the image in the rectangular frame when the number of the at least one human eye image is multiple, wherein the second preprocessing comprises at least binarization processing, corrosion processing and dilation processing;

a connected domain area acquisition unit configured to acquire the area of the connected domain in each rectangular frame;

a main eye determination unit for determining the human eye in the rectangular frame corresponding to the connected domain with the largest area as the main eye, and also for determining the human eye in the rectangular frame as the main eye when the image number of the at least one human eye is one.

Optionally, the action acquisition module comprises: an image acquisition submodule configured to acquire a plurality of second original images, wherein the plurality of second original images are images captured sequentially after the first original image;

a connected domain area acquisition submodule configured to acquire the area of the connected domain in the rectangular frame corresponding to the main eye in each second original image for each second original image in the plurality of second original images;

a main eye state determination submodule configured to determine that the main eye is in a closed state when the area of the connected domain in the rectangular frame corresponding to the main eye is less than or equal to an area threshold;

a main eye action acquisition submodule configured to determine the closing time of the main eye or the closing times of the main eye within a set time period based on the closed state of the main eye in the plurality of second original images to obtain the action of the main eye.

Optionally, the device further comprises: a human eye center determination module configured to acquire the center position of the human eye in the rectangular frame in each second original image;

a main eye determination module configured to determine that the human eye in each second original image is the main eye when the distance between the center position of the human eye in each second original image and the center position of the main eye is less than or equal to a distance threshold.

Optionally, the set condition is that the number of times the main eye is closed exceeds a set number of times within a set time period, or the closing time of the main eye exceeds a closing time threshold.

According to a third aspect of an embodiment of the present disclosure, it is provided an electronic device, the device comprising:

a camera module;

a processor;

a memory for storing executable instructions and files of the processor;

wherein the processor is configured to execute the executable instructions in the memory to implement the steps of the self-photographing control method in the first aspect.

It should be understood that the above general description and the following detailed description are exemplary and explanatory only and do not limit the present disclosure.

BRIEF DESCRIPTION OF THE DRAWINGS

The drawings herein are incorporated in and constitute a part of the specification, illustrate embodiments consistent with the disclosure, and together with the description serve to explain the principles of the disclosure.

DETAILED DESCRIPTION

Exemplary embodiments will be described in detail herein, examples of which are shown in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. On the contrary, they are merely examples of devices and methods consistent with some aspects of the present disclosure as claimed in the appended claims.

Figure 1:
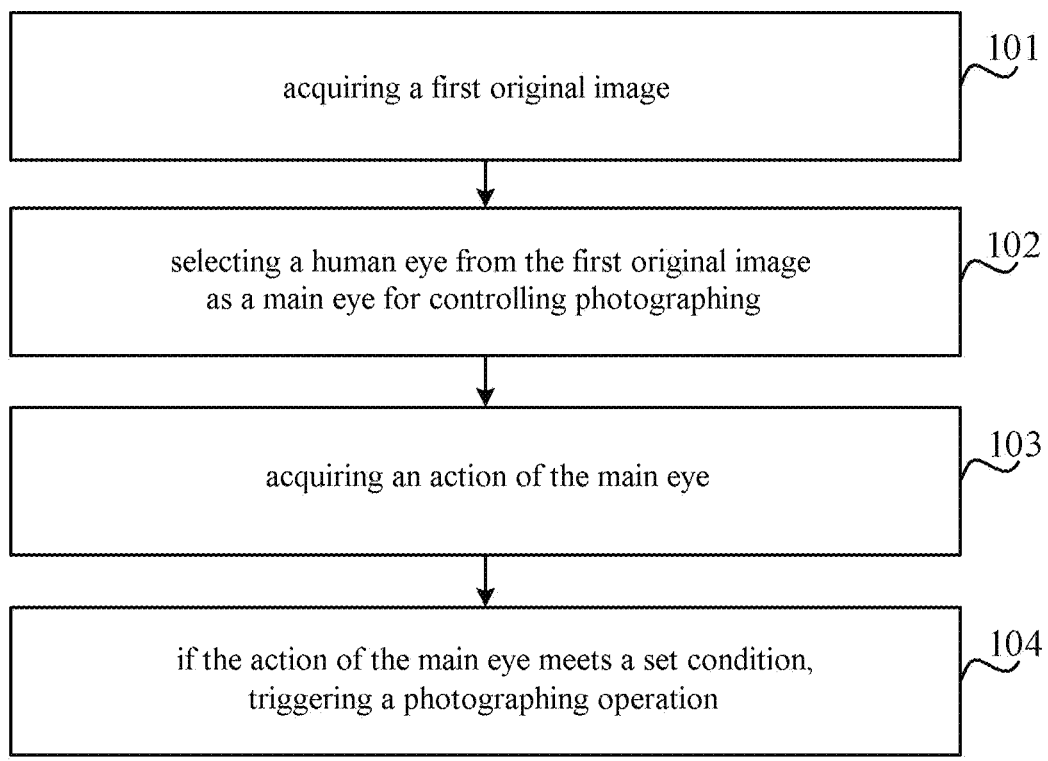
FIG. 1 is a schematic flowchart of a self-photographing control method according to an embodiment of the present disclosure.

At present, in the process of self-photographing, the user will use the blink of an eye to realize self-photographing. However, in the case of multi-person selfie, as long as one person blinks, it will take photos by mistake, resulting in a poor self-photographing experience. In order to solve the above problems, an embodiment of the present disclosure provides a self-photographing control method. FIG. 1 is a flowchart of a self-photographing control method according to the embodiment of the present disclosure. It should be noted that in order to ensure the reliable execution of the self-photographing control method, for example, it is necessary to ensure that one eye of a plurality of users in the image is larger, for example, the user can adjust the position of the electronic device, adjust the user's position, set the user's formation, etc. to ensure that one eye of a plurality of users is larger. For convenience of explanation, the subject for performing the self-photographing control method may be a processor of an electronic device such as a camera or a mobile phone.

Referring to FIG. 1, a self-photographing control method according to the embodiment of the present disclosure comprises:

101, acquiring a first original image

During the focusing process, the camera or image sensor will capture images, which can be cached in memory in advance. When the cache part of the memory reaches full load, the image acquired later will replace the earliest image. In one embodiment, at the camera or image sensor, images cached in a memory may be sequentially sent to the processor.

In the next steps, the processor will take the above image as the processing object and select a human eye from the human eyes of multiple users in the image as the main eye. After the main eye is determined, the processor will also process the images acquired later according to the determined main eye. The specific processing procedure will be described in detail in subsequent embodiments, and will not be described here. For the sake of distinction, in some embodiments of the present disclosure, the image mentioned or referred before or during the determination of the main eye is referred to as the first original image; while the image acquired after the determination of the main eye is referred to as the second original image. It will be appreciated that the second original image is an image taken sequentially after the first original image.

102, selecting a human eye from the first original image as the main eye for controlling photographing.

In this embodiment, the processor processes the first original image to obtain a face image of each user, so that at least one human face image can be obtained. Then, the processor processes each human face image to obtain at least one human eye image. Finally, the processor selects a human eye from the at least one human eye image as the main eye.

In one embodiment, the processor delays for a period of time (e.g., 0.5-2 seconds) before starting processing the image, detects user A moving continuously in the image, acquires face images of user A, then acquires human eye images of user A based on the face images of user A, and selects one of the human eyes from the human eye images as the main eye. This embodiment is applicable to the scenario of multi-person selfie in which one user A places a camera and then A returns to a plurality of users to control the self-photographing based on the eye movement of A, preventing photographing the moving user A if other users controlling the self-photographing, and thus improving the efficiency of the self-photographing and the success rate of the self-photographing image.

In one embodiment, the processor may also prompt the user A to store his own image in advance, and then the processor identifies the user A in the image using the face recognition algorithm, and then determines one eye of the user A as the main eye. Then the processor controls the self-photographing according to the main eye. In this way, the solution of the application can also be implemented.

Figure 3:
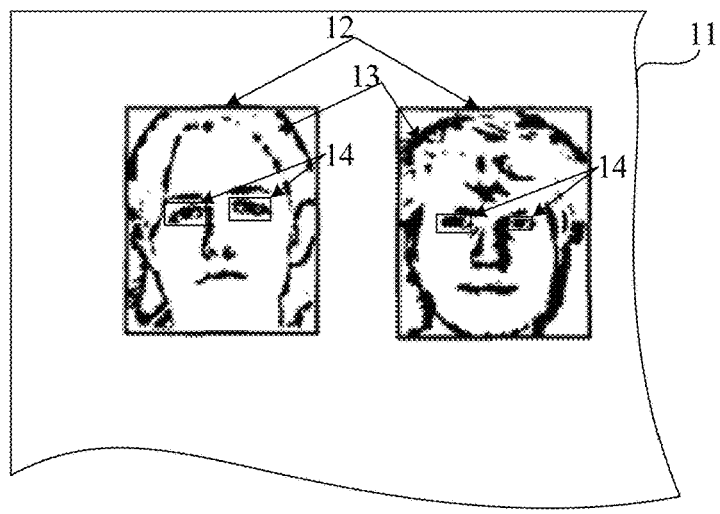
FIG. 3 is a schematic view of a first original image, human face images, and human eye images according to an embodiment of the present disclosure.

In one embodiment, when the user is far away from the electronic device such as a camera or a mobile phone, for example, 3 meters away, the processor may directly select a human eye in the human face image with the largest area in a face bounding frame (the face bounding frame may be, for example, the smallest rectangle that holds the entire human face image as shown in FIG. 3, i.e., the smallest rectangle tangent to the contour of the human face image) as the main eye. This embodiment can be applied to scenarios where multiple users are far away from the electronic device, for example, 10 meters away, at which time the area of human eyes of each user is not much different. Directly taking the human eye in the human face image with the largest area of the face bounding frame as the main eye can reduce the amount of calculation and improve the real-time response.

In one embodiment, when there is only one human eye image, the way to select the main eye may be to directly determine the human eye in the human eye image as the main eye.

In another embodiment, when the user is close to the electronic device such as a camera or a mobile phone, for example, within 3 meters, taking the human eye image including a plurality of human eyes as an example, the processor acquires an area of each human eye in the human eye image, taking the human eye with the largest area as the main eye. Generally, the area of the human eye is represented by the area of the human eye bounding frame (the human eye bounding frame may be, for example, the smallest rectangle containing a single eye image as shown in FIG. 3, i.e., the smallest rectangle tangent to the contour of the single eye image), which can reduce the amount of calculation and improve the real-time response. This method is suitable for scenarios where multiple users are close to the electronic device, for example, within 2 m, at which time the areas of the bounding frames of human eyes are different from each other in each human eye image. The control accuracy can be improved by taking the human eye with the largest area of the bounding frame of the human eye as the main eye. Subsequent embodiments will be described in detail and will not be described here.

It should be noted that the longer distance (e.g. more than 3 meters listed above) and the shorter distance (e.g. less than 3 meters listed above) here also vary depending on the specific type of electronic device and can be adjusted according to the actual situation.

103, acquiring the action of the main eye.

In this embodiment, the processor determines the action of the main eye according to the closing time or the closing times of the main eye. It is understood that the action of the main eye can be set according to the specific scenario, and is not limited here.

104, if the action of the main eye meets a set condition, triggering the photographing operation.

In this embodiment, the set conditions of the main eye action are stored in advance. In one embodiment, the set condition is that the main eye closing time is greater than or equal to 2 s. In another embodiment, the set condition is that the number of times the main eye is closed within the set time period is greater than or equal to a set number of times, such as the number of times the main eye is closed within 4 s is more than 3 times. The set conditions can be set according to specific scenarios, and are not limited here.

The closing time refers to the duration that the main eye is kept closed from the open state (open eyes) to the closed state (close eyes) and then to the open state again. Understandably, the main eye blinks once from opening to closing it and then to opening it again, and the number of times the main eye is in a closed state is the number of times the main eye blinks.

When the action of the main eye meets the set condition, the processor triggers the camera photographing operation. For example, the processor triggers the camera to take a picture once when the set condition is that the main eye closing time is greater than 2 s. As another example, when the set condition is that the main eye blinks many times during the set time period (the blink number n is greater than 1), the processor triggers the camera continuous photographing n times. Wherein, the triggering can be realized by sending a control command to the camera or image sensor, or to the control button, and it can be set by the technician according to the specific scenario, which is not limited here.

When the action of the main eye does not meet the set condition, the processor may continue to detect the action of the main eye, for example, returning to step 103. Alternatively, when the main eye disappears or is inactive for a long time, the processor may also continue to determine a new main eye, for example, returning to step 101. The processing action of the processor can be set according to the specific scenario and is not limited here.

In this embodiment, the processor controls the photographing process by selecting one person's eye in the first original image as the main eye to realize the self-photographing operation of multiple users, so that false photographing caused by the blink of an eye of a user in the multi-user self-photographing process in the related art can be avoided, the self-photographing accuracy can be improved, and the self-photographing effect can be improved.

Figure 2:
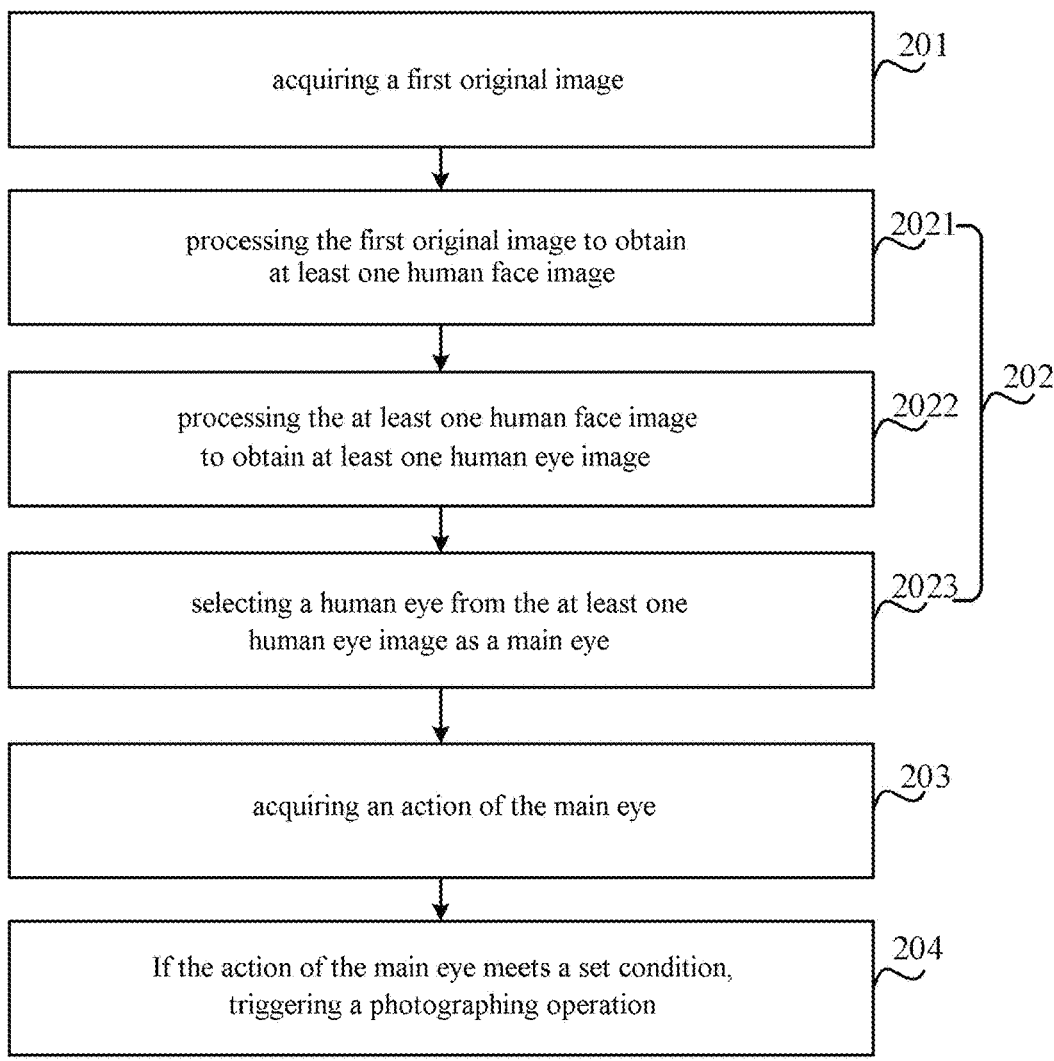
FIG. 2 is a schematic flowchart of another self-photographing control method according to an embodiment of the present disclosure.

FIG. 2 is a flowchart of another self-photographing control method according to an embodiment of the present disclosure. Referring to FIG. 2, the self-photographing control method includes steps 201 to 204, wherein:

201, acquiring a first original image.

The specific methods and principles of step 201 and step 101 are consistent. Please refer to the relevant contents of FIG. 1 and step 101 for detailed description, which will not be repeated here.

202, selecting a human eye from the first original image as the main eye for controlling photographing.

Referring to FIG. 2, in this embodiment, the processor processes the first original image to obtain a face image of each user, so that at least one human face image can be obtained (corresponding to step 2021). Then, the processor processes each human face image to obtain at least one human eye image (corresponding to step 2022). Finally, the processor selects one human eye from at least one human eye image as the main eye (corresponding to step 2023).

In one embodiment, referring to FIG. 3, the processor acquires at least one human face image according to the following steps, including:

The processor converts the first original image 11 from RGB color space to YCbCr color space, and then the processor compares each region in the first original image with a skin color sample using an elliptical skin color model to achieve the purpose of distinguishing skin color regions from non-skin color regions in YCbCr color space.

Understandably, the skin color areas distinguished in this process include some skin color-like areas.

Wherein, skin color samples can include front face photos of different genders, ages and races, and non-skin color regions in each skin color sample can be manually removed.

After that, the processor binarizes the skin color region in the first original image 11 to obtain a binary image, and performs an erosion operation and a dilation operation on the binary image to filter the skin color-like regions with smaller areas and smaller holes in the binary image.

Finally, the processor calculates the bounding frame 12 of the face region in the filtered binary image. The first original image 11 is segmented with the bounding frame 12 as a boundary, and the image in the bounding frame 12 is taken as the human face image 13 of the first original image.

Through the above process, the processor can obtain at least one human face image 13.

Figure 4:
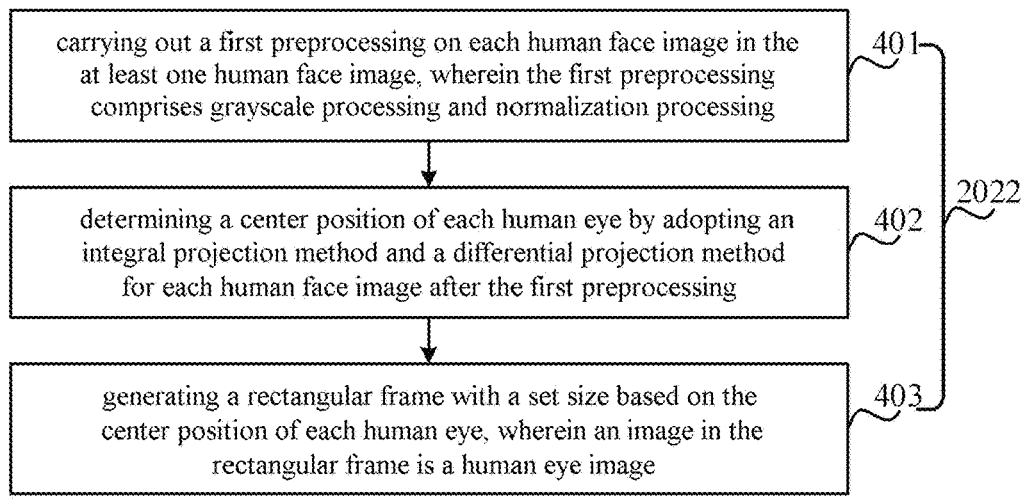
FIG. 4 is a schematic flowchart of yet another self-photographing control method according to an embodiment of the present disclosure.

In one embodiment, based on the above-mentioned at least one human face image 13, referring to FIG. 4, the processor acquires at least one human eye image 14 according to the following steps 401 and 402, wherein in step 401, as for each human face image in at least one human face image, the processor performs a first preprocessing on each eye image to obtain a preprocessed human face image. The first preprocessing may include a gray-scale processing and a normalization processing. Understandably, after the first preprocessing, the effects of the changes in the external environment and the image translation, scaling and rotation on face detection can be reduced.

In step 402, as for each human face image after the first preprocessing, the processor uses an integral projection method and a differential projection method to determine the center position of the human eye. It should be noted that in this embodiment, the center position of the human eye is obtained by using the following two characteristics of the human eye region: (1) the gray value of the image in the human eye region is lower than the gray value of the image in most face regions. (2) Compared with other regions, the gray value change rate of the image in the human eye region is larger.

Figure 5:
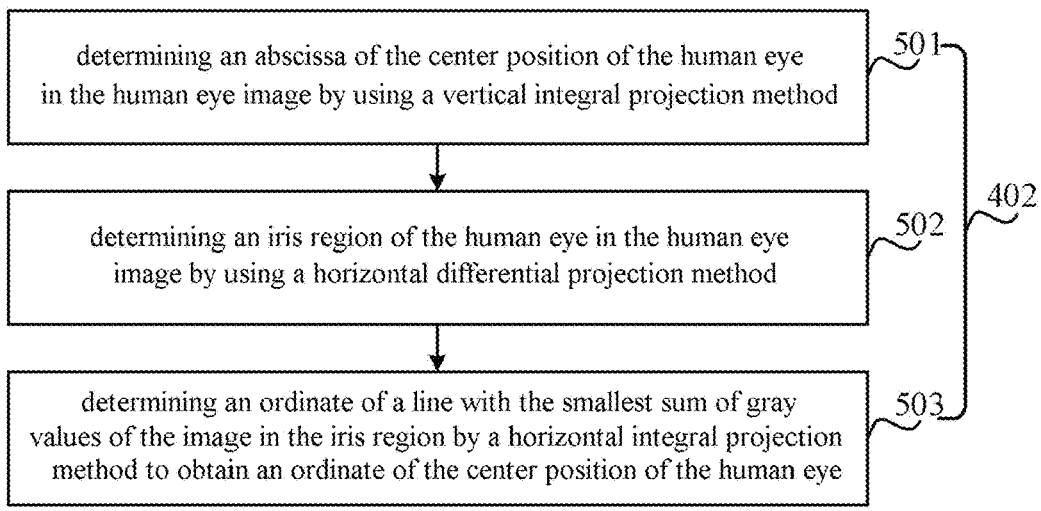
FIG. 5 is a schematic flowchart of yet another self-photographing control method according to an embodiment of the present disclosure.

In one embodiment, referring to FIG. 5, the step of the processor acquiring the center position of the human eye in each human face image may include:

First, the processor uses a vertical integration projection method to determine the abscissa of the center position of the human eye in the human eye image (corresponding to step 501). The formula of the vertical integral projection method is as follows:

$$M_v(x) = \sum_{y_1}^{y_2} G(x, y)$$

Where x represents the abscissa of a pixel point, y represents the ordinate of a pixel point, G(x,y) represents the gray value of the human face image at the pixel point (x, y), and $M_v(x)$ represents the sum of the gray values of each pixel point in the vertical direction (i.e., the column direction). Wherein, the abscissa range of each column of pixel points in the human face image is $[x_1, x_2]$.

Figure 6:
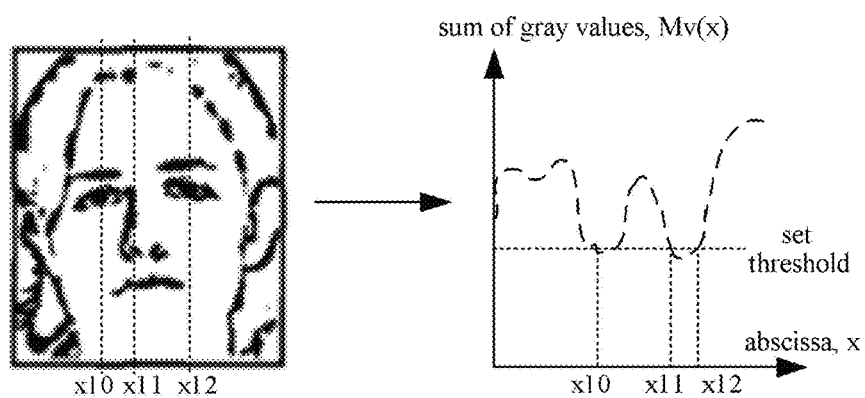
FIG. 6 is a schematic view of acquiring an abscissa of a human eye according to an embodiment of the present disclosure.

The processor obtains the sum $M_v(x)$ of the gray values of each column of pixel points so as to obtain the relationship between the sum of the gray values and the abscissa shown in FIG. 6. The processor then compares the sum of the gray values of each column with a set threshold (dashed horizontal line in FIG. 6), so that at least one column of pixel points can be obtained, the sum of the gray values of each column of pixel points does not exceed (that is, less than or equal to) the set threshold, and the abscissas obtained in FIG. 6 are x10, x11 and x12, respectively. The set threshold can be the product of the maximum value of the sum of the gray values of each column of pixels in the range $[x_1, x_2]$ and the threshold factor $\alpha(\alpha<1)$. The abscissa corresponding to the at least one column of pixel points is the abscissa of the center position of at least one human eye in the human face image.

Wherein, the purpose of setting the threshold factor $\alpha(\alpha<1)$ is to adjust the value of $\alpha(\alpha<1)$, i.e., to adjust the value of the set threshold according to the specific scenario. For example, when the number of multiple columns of pixel points in the calculation result is large, the value of the threshold factor $\alpha$ can be lowered to reduce the number of columns of pixel points in the calculation result. For another example, when the number of columns of pixel points in the calculation result is small or even zero, the value of the threshold factor $\alpha$ can be increased to increase the number of columns of pixel points in the calculation result, so that the number of columns of pixel points obtained can meet the requirements and the calculation accuracy can be improved.

Secondly, the processor determines the iris region of the human eye in the human eye image using a horizontal difference projection method (corresponding to step 502). Since the eyebrow has two edges, and the gray value difference between adjacent pixel points at each edge is large, i.e. the change rate of gray value is large (from the surrounding area to the eyebrow and from the eyebrow to the surrounding area), the corresponding change rate of at least four edges of the human eye is large (area without iris: from the surrounding area to the eye orbit, from the eye orbit to the eye white, from the eye white to the eye orbit, from the eye orbit to the surrounding area; areas with iris: from the surrounding area to the eye orbit, from the eye orbit to the eye white, from the eye white to the iris, from the iris to the eye white, from the eye white to the eye orbit, from the eye orbit to the surrounding area). Therefore, in this embodiment, a horizontal area with a larger change rate (i.e., the larger the variance, the larger the change rate), can be obtained by the horizontal differential projection method, so that the eyebrow area can be separated from the human eye image and only the iris area can be obtained. In this way, the influence of the eyebrow on the human eye can be avoided.

Under the condition that the coordinates and gray values of each pixel point in the human face image are known, the variance corresponding to each row of pixel points can be calculated based on the formula of the horizontal difference projection method. The formula of the horizontal difference projection method is as follows:

$$\sigma_h^2(y) = \frac{1}{x_2 - x_1} \sum_{x_i = x_1}^{x_2} \left[ G(x_i, y) - \frac{M_h(y)}{x_2 - x_1} \right]^2$$

Where, $x_2$, $x_1$ represents the maximum value and minimum value of the abscissa of a pixel point, $x_i$ represents the abscissa of the I-th pixel point, $M_h(y)$ represents the sum of the gray values of each row of pixel points in the horizontal direction, and $\sigma_h^2(y)$ represents the variance corresponding to each row of pixel points.

Figure 7:
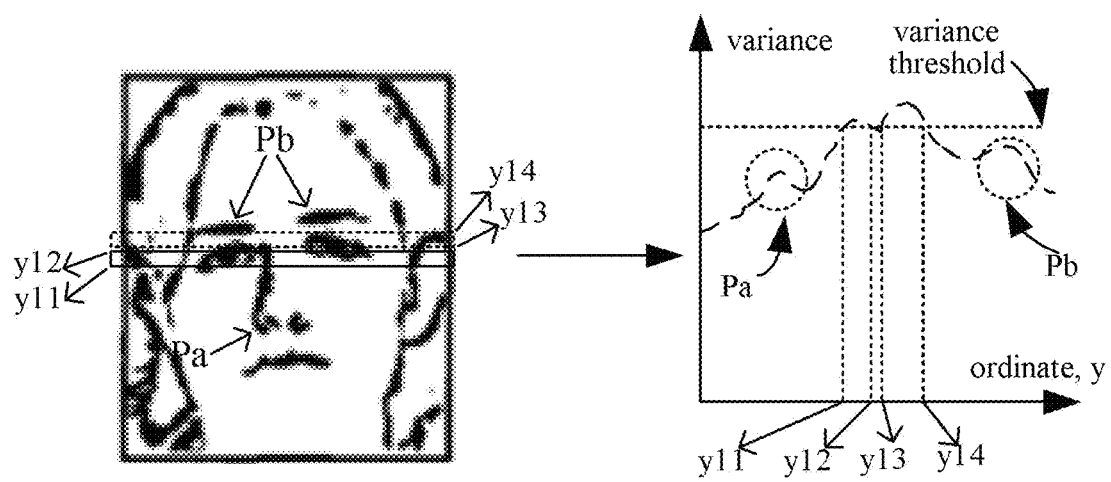
FIG. 7 is a schematic view of acquiring a horizontal region of a human eye according to an embodiment of the present disclosure.

In this step, based on the (2) th characteristic of the human eye region, the processor calculates the variance $\sigma_h^2(y)$ corresponding to the gray value of each row of pixel points to obtain the relationship between the variance and the ordinate as shown in FIG. 7. After that, the processor acquires at least one horizontal region whose variance $\sigma_h^2(y)$ corresponding to each row of pixel points is not less than (greater than or equal to) the variance threshold, with the uppermost edge of each horizontal region corresponding to the uppermost side of the iris and the lowermost edge corresponding to the lowermost side of the iris, that is, the iris region of the human eye can be determined. FIG. 7 shows a scenario with two horizontal areas. The uppermost side of the horizontal area located below (the area within the solid frame in FIG. 7) corresponds to the uppermost side of the left iris, the ordinate is y12, the lowermost side of the horizontal area corresponds to the lowermost side of the left iris, and the ordinate is y11. The uppermost side of the horizontal area located above (the area within the dashed frame in FIG. 7) corresponds to the uppermost side of the right iris, the ordinate is y14, the lowermost side of the horizontal area corresponds to the lowermost side of the right iris, and the ordinate is y13.

With continued reference to FIG. 7, the variance corresponding to the nasal tip region pa and the variance corresponding to the eyebrow region Pb in the human face image are also shown in FIG. 7. Since the change rate of pixel values in the nasal tip region PA and the eyebrow region PB is smaller than the change rate of pixel values in the iris region, the eyebrow region and the iris region can be separated by adjusting the variance threshold to reduce the influence of eyebrow on human eye recognition.

The variance threshold may be the product of the minimum variance value of the gray value of each row of pixel points and the threshold factor $\beta(\beta>1)$. The purpose of setting the threshold factor $\beta(\beta>1)$ is to adjust the value of $\beta$, i.e., the value of the variance threshold according to the specific scenario, so as to ensure that the number of horizontal areas can meet the requirements. For details, please refer to the description of the threshold factor $\alpha$ and this will not be repeated here.

Finally, the processor uses the horizontal integral projection method to determine the ordinate of the line with the smallest sum of the gray values of the image in the iris region to obtain the ordinate of the center position of the human eye (corresponding step 503). The formula of the horizontal integral projection method is as follows:

$$M_h(y) = \sum_{x_1}^{x_2} G(x, y)$$

Figure 8:
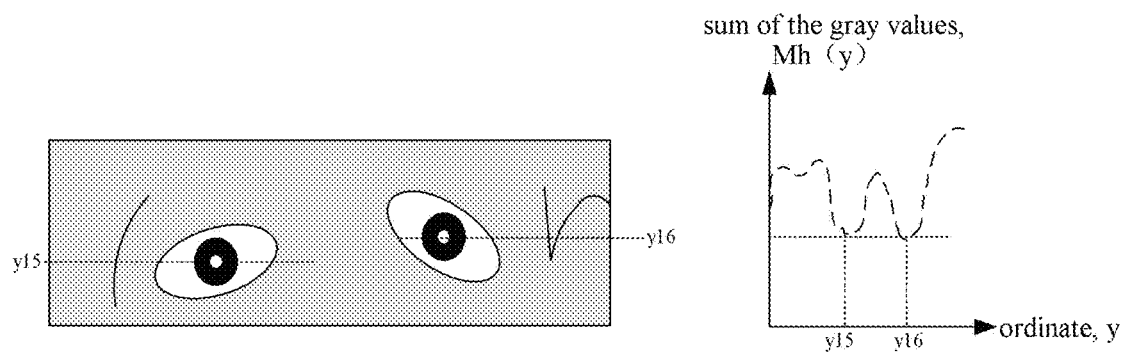
FIG. 8 is a schematic view of acquiring an ordinate of a human eye according to an embodiment of the present disclosure.

In this step, the processor can obtain the row with the smallest sum of gray values in the iris region, and the ordinate corresponding to this row is the ordinate of the center position of the human eye. FIG. 8 shows the row with the smallest gray values corresponding to each horizontal region, with the ordinate y15 and y16 respectively, i.e., the ordinate of the left iris is y15 and the ordinate of the right iris is y16. Referring to FIGS. 6 and 8, the coordinates of the left eye (x10, y15) and the coordinates of the right eye (x12, y16) in the human face image in FIG. 6 can be obtained. Moreover, the interference information in the abscissa obtained in step 501 can also be excluded in combination with the contents corresponding to FIGS. 6 and 8.

It can be seen that the processor can obtain the abscissa and ordinate of the center position of each human eye through steps 501-503. It will be understood that step 501 may be performed later than step 502 and step 503, and may also be performed simultaneously with step 502 and step 503, and the center position of each human eye may also be obtained.

In step 403, the processor generates a rectangular frame with a set size based on the center position of each human eye, ensuring that there is only one eye in the rectangular frame, and then the image in the rectangular frame is a human eye image. The height of the rectangular frame is a, and the width of the rectangular frame is b. The values of height a and width b can be set according to the scenario.

It can be seen that the processor can obtain at least one human eye image through steps 401 to 403.

Figure 9:
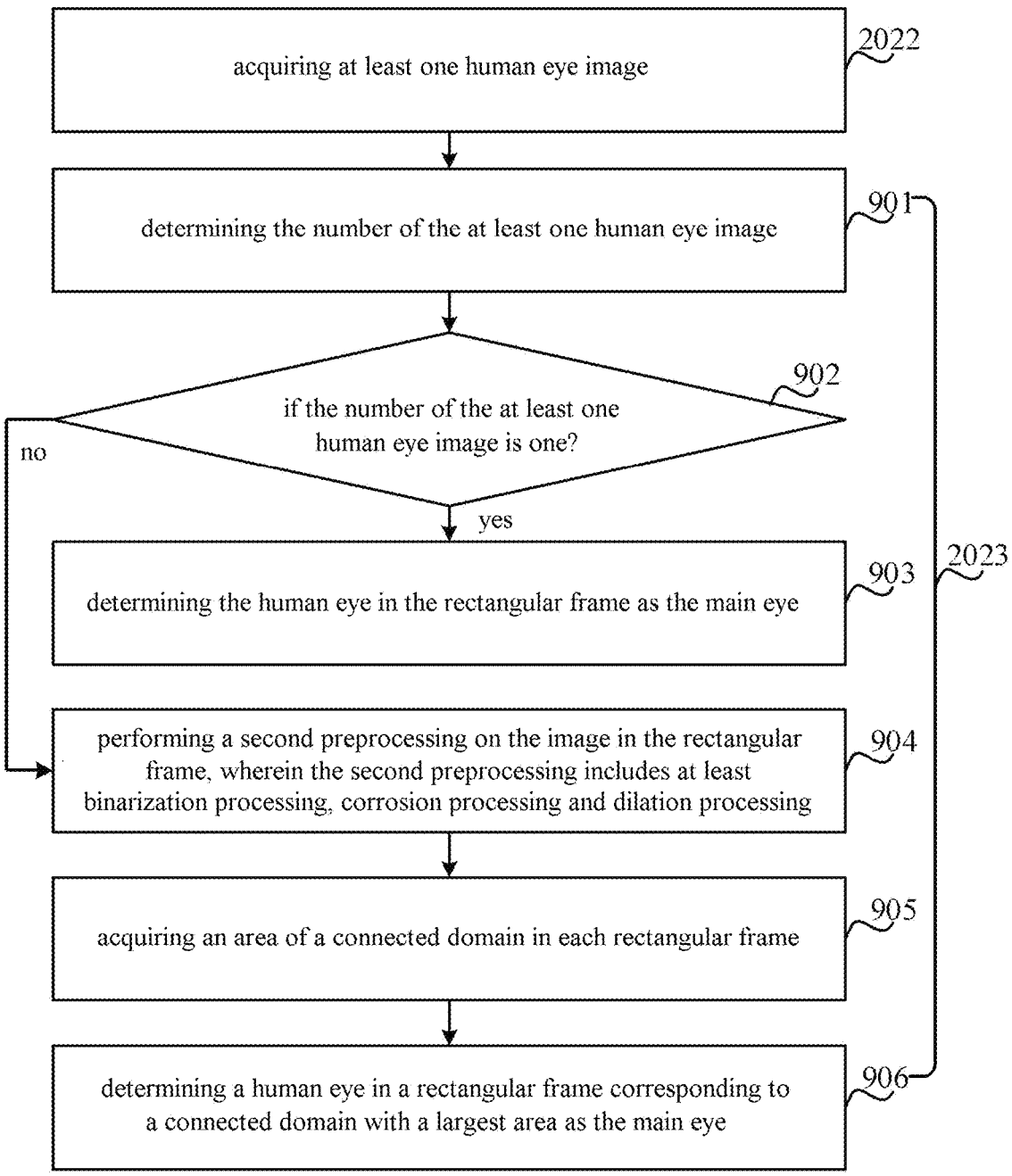
FIG. 9 is a schematic flowchart of yet another self-photographing control method according to an embodiment of the present disclosure.

Based on at least one human eye image, the processor selects one of the human eyes as the main eye for control photographing. Referring to FIG. 9, the processor first acquires the number of at least one human eye image (corresponding step 901) and determines whether there is only one human eye image (corresponding step 902). In one embodiment, if the number of human eye images is 1, the processor takes the human eye in the human eye image as the main eye (corresponding to step 903). In another embodiment, if the number of human eye images is multiple, the processor continues to process the multiple human eye images (corresponding to steps 904 to 906).

For each human eye image 14, the processor performs a second preprocessing on the image within the rectangular frame (corresponding to step 904). The second preprocessing may include binarization processing, corrosion processing and dilation processing, and may be set according to the specific scenario, and is not limited here. It can be understood that in this embodiment, the processor only processes the human eye image, that is, the image in the rectangular frame, which can reduce the amount of calculation and is beneficial to improving the real-time performance.

Figure 10:
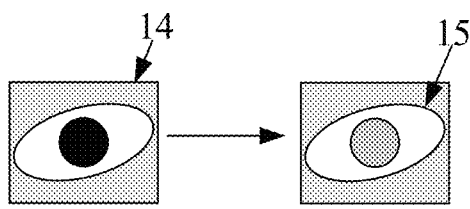
FIG. 10 is a schematic view of a connected domain in a human eye image according to an embodiment of the present disclosure.

For each human eye image 14, the processor acquires the area of the connected domain (complex connected domain) within each rectangular frame (corresponding to step 905), wherein the connected domain 15 of each human eye image, as shown in FIG. 10, includes the area of the graph enclosed by the closed curve indicated by arrow 15 (roughly corresponding to the area of the graph enclosed by the human eye orbit), and the area of the connected domain 15 in the human eye image includes the area of the iris. Then, the processor sorts the areas of the connected domains according to size, and takes the human eye in the rectangular frame corresponding to the connected domain with the largest area as the main eye (corresponding step 906).

203, acquiring the action of the main eye.

In this embodiment, after the processor acquires the main eye, the rectangular frame outside the main eye will remain in the subsequent image (i.e., the second original image), thus ensuring the continuity of the main eye position. In order to ensure that the human eye in the rectangular frame is the main eye, the processor also processes the image in the rectangular frame in the second original image, i.e., the second preprocessing, and then obtains the coordinates of the center position of the human eye. If the distance between the center position of the human eye in the rectangular frame and the center position of the main eye is less than or equal to the distance threshold, the human eye in the rectangular frame is the main eye. The distance threshold can be set according to a specific scenario. In one embodiment, the distance threshold is L, and the value can be set according to the specific scenario.

If the distance between the center position of the human eye in the rectangular frame and the center position of the main eye is greater than the distance threshold, the processor ignores the previously obtained main eye, re-acquires a first original image and re-determines the center position of the main eye, referring to the contents of the above embodiments.

In one embodiment, the processor performs a second preprocessing on the image in the rectangular frame to obtain the area of the main eye connected domain. If the area of the connected domain is less than or equal to the area threshold, the processor determines that the main eye is in a closed state, and the corresponding second original image number is P1. According to the above solution, the processor continuously processes a plurality of second original images to determine the main eye state in each second original image. When the main eye in a certain second original image P2 is open (the area of the connected region is larger than the area threshold), the closing time of the main eye can be calculated according to the acquisition time of the second original image P1 and the second original image P2.

In one embodiment, the processor may also detect the number of times the main eye is closed within a set time period. The set time period can be 10 s, 5 s or 3 s, etc., and can be set according to the specific scenario. For example, when the processor detects that the main eye is in the closed state for the first time, it starts timing until the set time period (i.e., the timing time period is equal to the set time period) is elapsed, and counts the number of times the main eye is closed within this set time period. Of course, the processor may also start timing when it detects that the main eye is closed for the first time. If the processor detects that the main eye is closed again during the timing process when the timing time does not exceed the interval time, it may re-time when the main eye is closed until the timing time exceeds the set interval time, and then count the number of times the main eye is closed, thus also realizing the solution of the present application.

204, If the action of the main eye meets the set condition, triggering the photographing operation.

The specific methods and principles of step 204 and step 104 are consistent. Please refer to the relevant contents of FIG. 1 and step 104 for a detailed description, which will not be repeated here.

In this embodiment, the abscissa of the center position of the human eye is obtained by a vertical integral projection method, and the ordinate of the center position of the human eye is determined by a horizontal differential projection method and the horizontal integral projection method. In this embodiment, the iris region is first determined by the horizontal differential projection method, and then the ordinate of the center position is determined, so that the influence of eyebrows on human eyes can be avoided, the accuracy of the acquired main eye can be improved, and the accuracy of photographing control can be improved. Moreover, in the process of determining the action of the main eye in this embodiment, the processor can only process the image in the rectangular frame corresponding to the main eye, which can reduce the amount of calculation and improve the real-time performance of the detection of the main eye.

Figure 11:
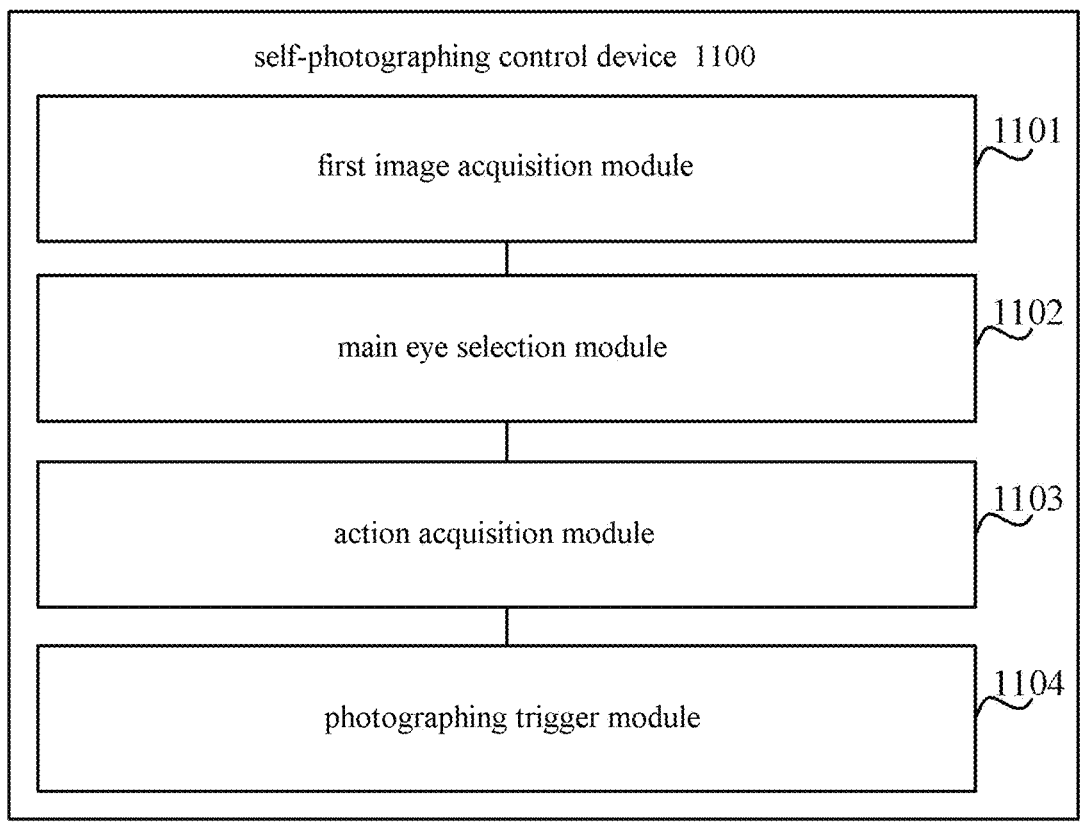
FIG. 11 is a block diagram of a self-photographing control device according to an embodiment of the present disclosure.

The embodiment of the present disclosure also provides a self-photographing control device, and FIG. 11 is a block diagram of a self-photographing control device according to the embodiment of the present disclosure. Referring to FIG. 11, the self-photographing control device 1100 includes:

a first image acquisition module 1101 for acquiring a first original image;

a main eye selection module 1102 for selecting a human eye from the first original image as the main eye for controlling photographing;

an action acquisition module 1103 for acquiring actions of the main eye;

a photographing trigger module 1104 for triggering photographing operation when the action of the main eye meets the set condition.

Figure 12:
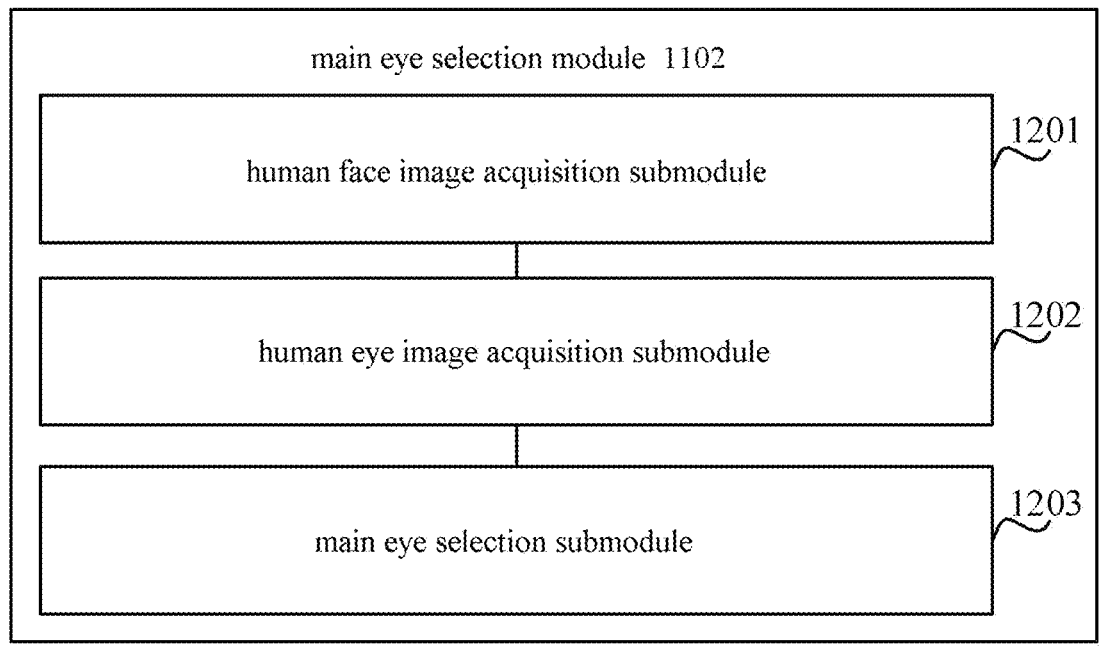
FIG. 12 is a block diagram of a main eye selection module in a self-photographing control device according to an embodiment of the present disclosure.

FIG. 12 is a block diagram of a self-photographing control device according to an embodiment of the present disclosure. Referring to FIG. 12, on the basis of the self-photographing control device shown in FIG. 11, the main eye selection module 1102 includes:

a human face image acquisition submodule 1201 for processing the first original image to obtain at least one human face image;

a human eye image acquisition submodule 1202 for processing the at least one human face image to obtain at least one human eye image;

a main eye selection submodule 1203 for selecting a human eye from the at least one human eye image as the main eye.

Figure 13:
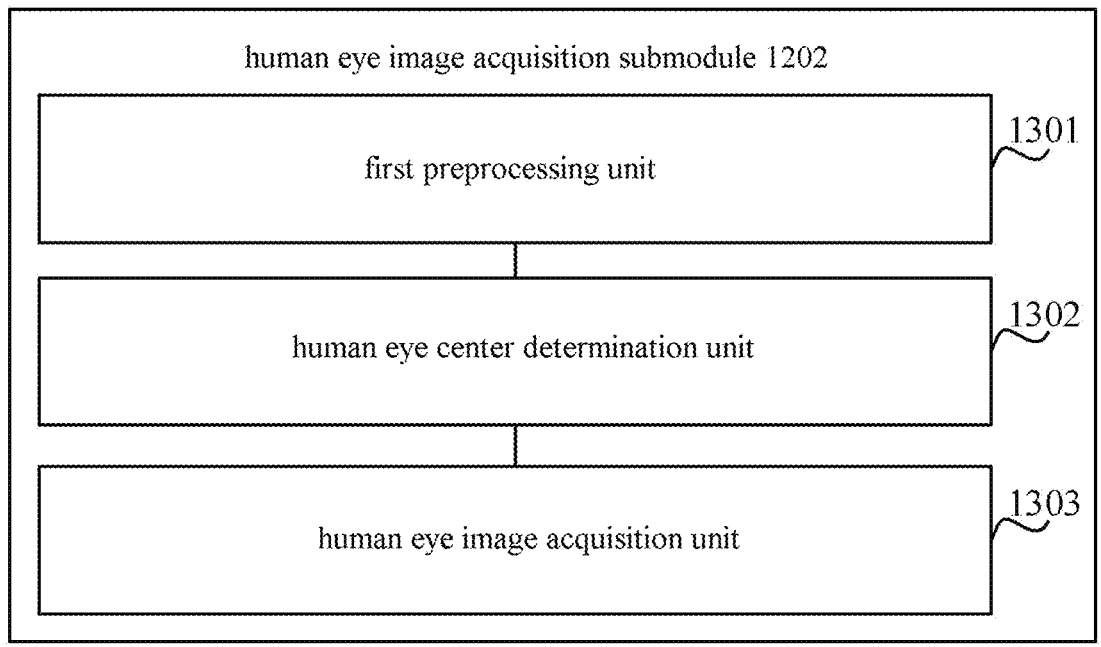
FIG. 13 is a block diagram of a human eye image acquisition submodule in a self-photographing control device according to an embodiment of the present disclosure.

FIG. 13 is a block diagram of a self-photographing control device according to an embodiment of the present disclosure. Referring to FIG. 13, on the basis of the self-photographing control device shown in FIG. 12, the human eye image acquisition submodule 1202 includes:

a first preprocessing unit 1301 configured to perform a first preprocessing on each human face image in the at least one human face image, the first preprocessing comprising grayscale processing and normalization processing;

a human eye center determination unit 1302 for determining the center position of each human eye by an integral projection method and a differential projection method for each human face image after the first preprocessing;

a human eye image acquisition unit 1303 for generating a rectangular frame with a set size based on the center position of each human eye, wherein the image in the rectangular frame is a human eye image.

Figure 14:
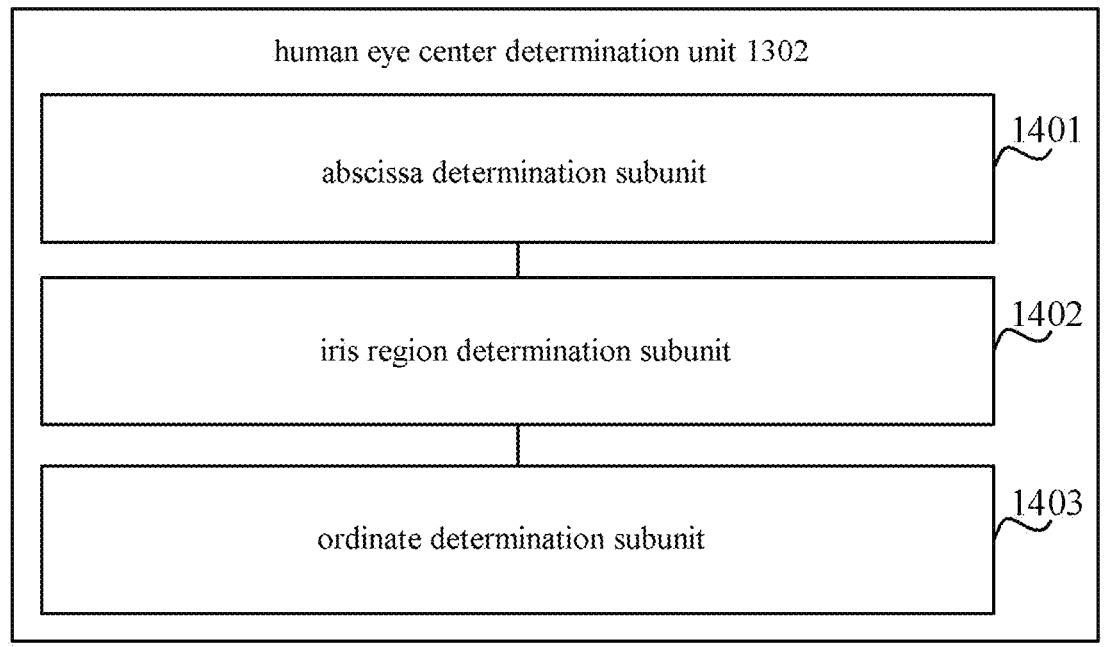
FIG. 14 is a block diagram of a human eye center determination unit in the self-photographing control device according to an embodiment of the present disclosure.

FIG. 14 is a block diagram of a self-photographing control device according to an embodiment of the present disclosure. Referring to FIG. 14, on the basis of the self-photographing control device shown in FIG. 13, the human eye center determination unit 1302 includes:

an abscissa determination subunit 1401 for determining the abscissa of the center position of the human eye in the human eye image by a vertical integral projection method;

an iris region determination subunit 1402 for determining an iris region of a human eye in the human eye image by a horizontal differential projection method;

an ordinate determination subunit 1403 for determining the ordinate of the line with the smallest sum of the gray values of the images in the iris region by a horizontal integral projection method to obtain the ordinate of the center position of the human eye.

Figure 15:
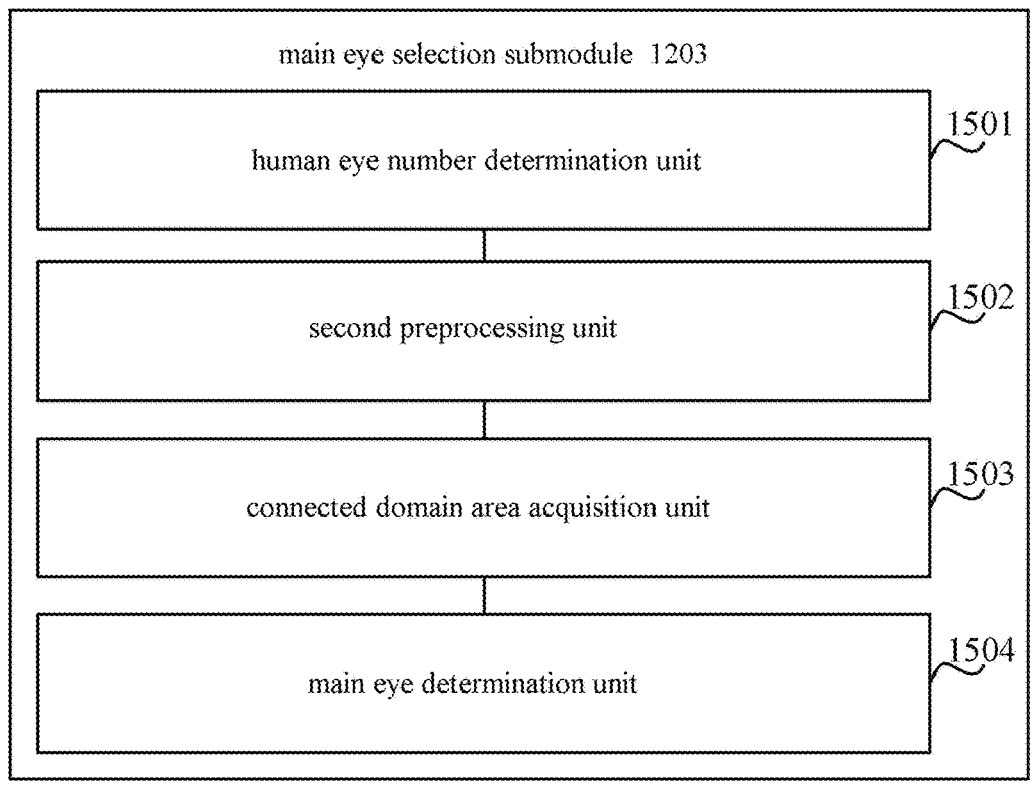
FIG. 15 is a block diagram of a main eye selection submodule in a self-photographing control device according to an embodiment of the present disclosure.

FIG. 15 is a block diagram of a self-photographing control device according to an embodiment of the present disclosure. Referring to FIG. 15, on the basis of the self-photographing control device shown in FIG. 12, the main eye selection submodule 1203 includes:

a human eye number determination unit 1501 for determining the number of the at least one human eye image;

a second preprocessing unit 1502 configured to perform a second preprocessing on the image in the rectangular frame when the number of the at least one human eye image is multiple, wherein the second preprocessing comprises at least binarization processing, corrosion processing and dilation processing;

a connected domain area acquisition unit 1503 configured to acquire the area of the connected domain in each rectangular frame;

a main eye determination unit 1504 for determining the human eye in the rectangular frame corresponding to the connected domain with the largest area as the main eye, and also for determining the human eye in the rectangular frame as the main eye if the image number of the at least one human eye is one.

Figure 16:
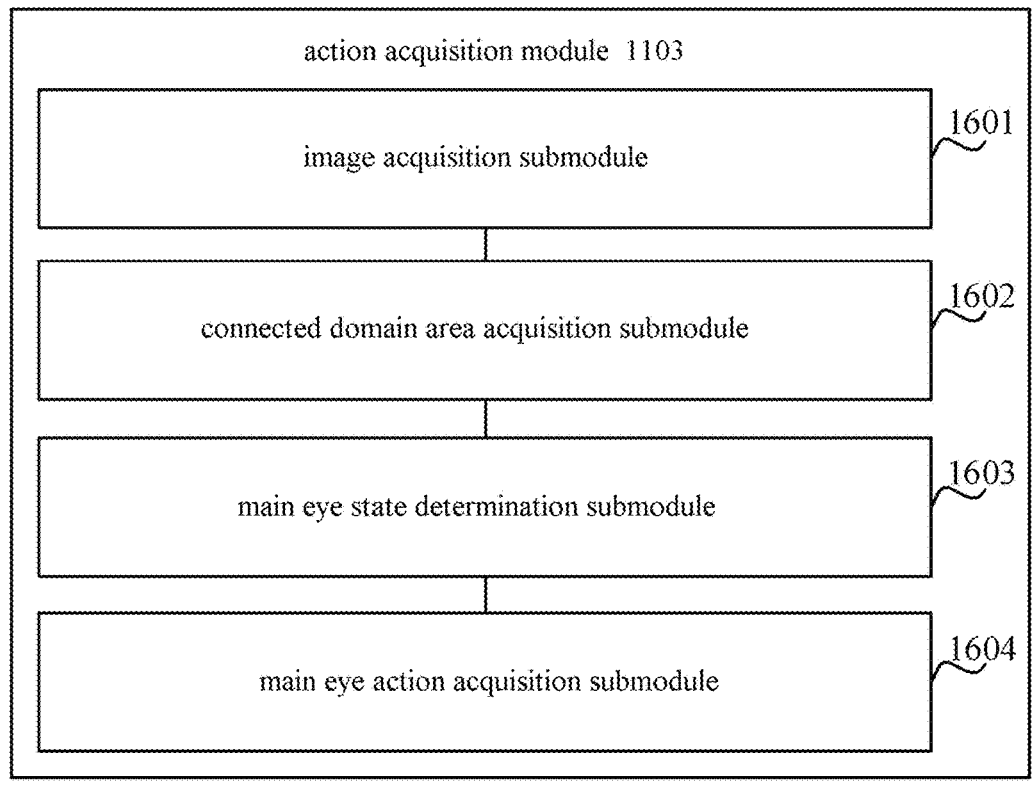
FIG. 16 is a block diagram of an action acquisition module in a self-photographing control device according to an embodiment of the present disclosure.

FIG. 16 is a block diagram of a self-photographing control device according to an embodiment of the present disclosure. Referring to FIG. 16, on the basis of the self-photographing control device shown in FIG. 11, the action acquisition module 1103 includes:

an image acquisition submodule 1601 for acquiring a plurality of second original images, wherein the plurality of second original images are images captured sequentially after the first original image;

a connected domain area acquisition submodule 1602 configured to acquire the area of the connected domain in the rectangular frame corresponding to the main eye in each of the plurality of second original images;

a main eye state determination submodule 1603 configured to determine that the main eye is in a closed state when the area of the connected domain in the rectangular frame corresponding to the main eye is less than or equal to an area threshold;

a main eye action acquisition submodule 1604 configured to determine the closing time of the main eye or the closing times of the main eye within a set time period based on the closed state of the main eye in the plurality of second original images to obtain the action of the main eye.

Figure 17:
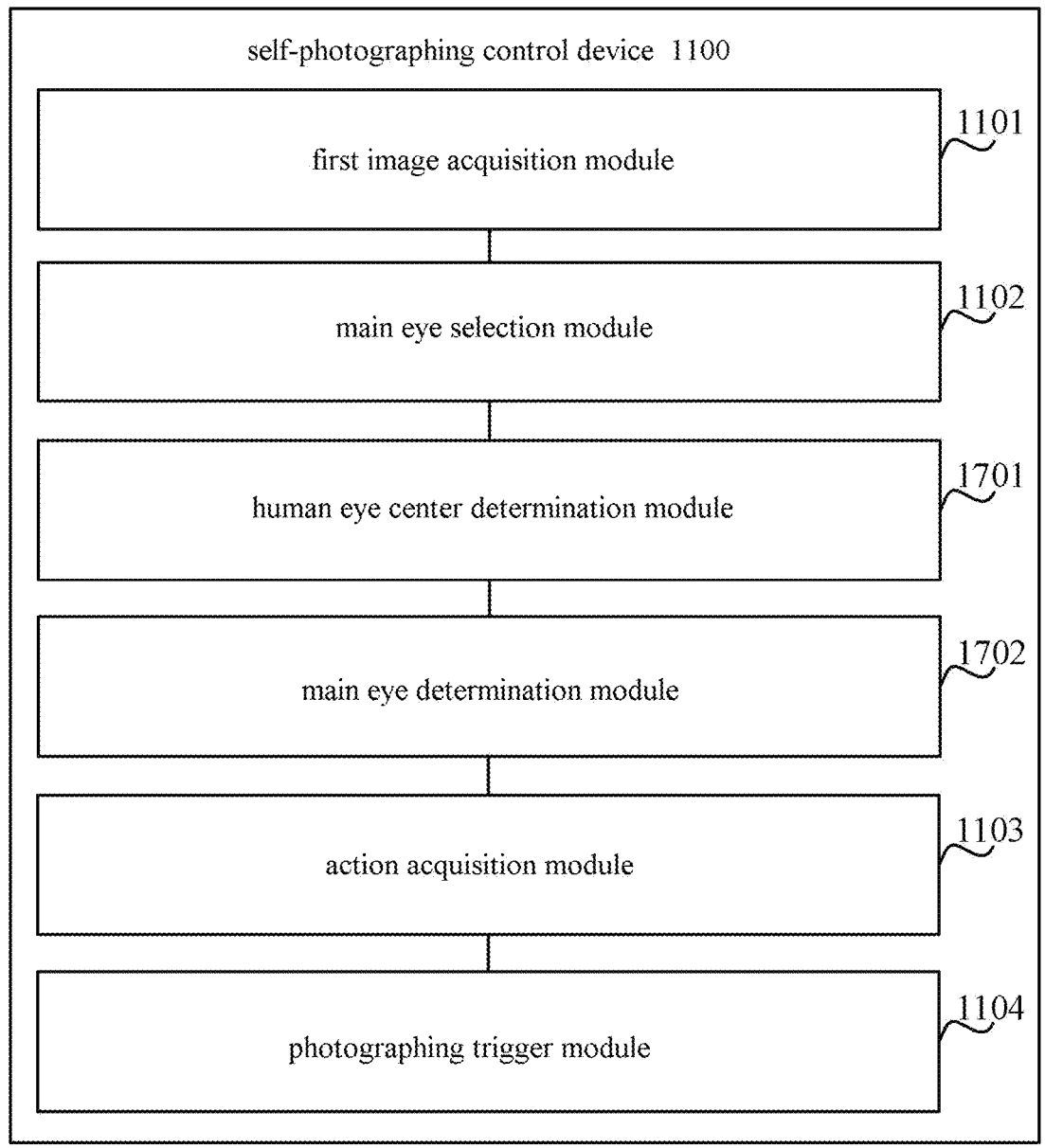
FIG. 17 is a block diagram of another self-photographing control device according to an embodiment of the present disclosure.

FIG. 17 is a block diagram of a self-photographing control device according to an embodiment of the present disclosure. Referring to FIG. 17, on the basis of the self-photographing control device shown in FIG. 11, the device 1100 further includes:

a human eye center determination module 1701 for acquiring the center position of the human eye in the rectangular frame in each second original image;

a main eye determination module 1702 for determining that the human eye in each second original image is the main eye if the distance between the center position of the human eye in each second original image and the center position of the main eye is less than or equal to a distance threshold.

Optionally, the set condition is that the number of times the main eye is closed exceeds a set number of times within a set time period, or the closing time of the main eye exceeds a closing time threshold.

Figure 18:
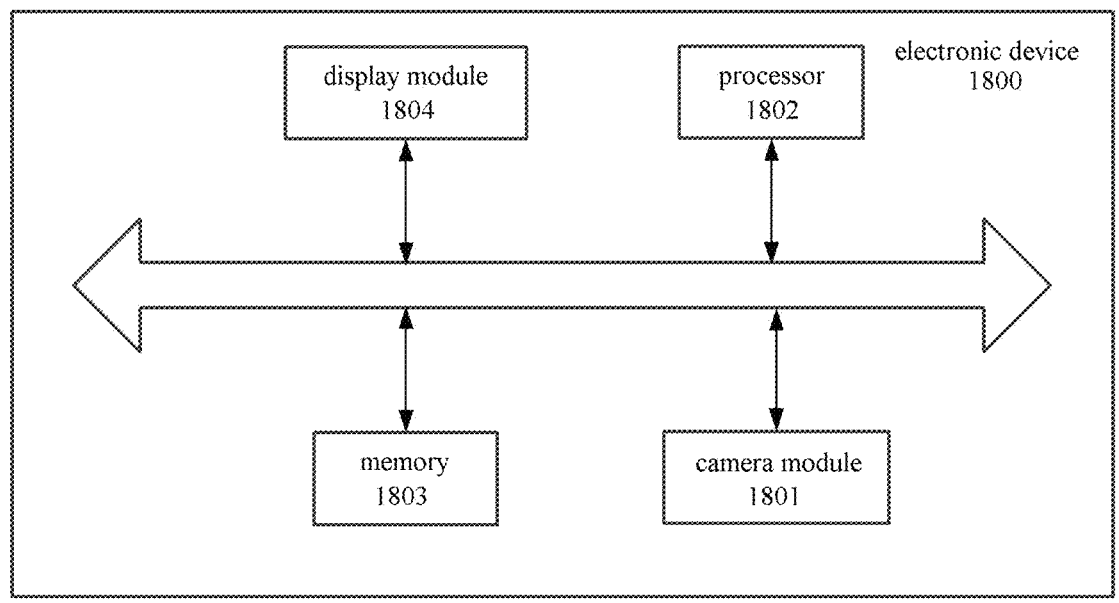
FIG. 18 is a block diagram of an electronic device according to an embodiment of the present disclosure.

The embodiment of the present disclosure also provides an electronic device. referring to FIG. 18, the electronic device 1800 includes:

a camera module 1801;

a processor 1802;

a memory 1803 for storing executable instructions and files of the processor 1802;

wherein the processor 1802 is configured to execute the executable instructions in the memory 1803 to implement the steps in the method of claim 1.

In one embodiment, with continued reference to FIG. 18, the electronic device may further include a display module 1804, which may include an LCD display screen. In the process of self-photographing, the user can adjust the position and photographing angle through the image displayed by the display module 1304, thereby improving the photographing effect.

It should be noted that the electronic device 1800 in this embodiment can be any product or component with photographing function such as a television, a mobile phone, a tablet computer, a notebook computer, a digital photo frame, a navigator, etc. The user can take a selfie with the electronic device.

According to the above embodiments, by selecting a person's eye as the main eye to control the self-photographing, it is possible to avoid the false photographing caused by the blink of an eye of a user in the multi-user self-photographing process in the related art, thereby improving the accuracy of the self-photographing and improving the effect of the self-photographing.

In this embodiment, the abscissa of the center position of the human eye is obtained by the vertical integral projection method, and the ordinate of the center position of the human eye is determined by the horizontal differential projection method and the horizontal integral projection method. In this embodiment, the iris region is first determined by the horizontal differential projection method, and then the ordinate of the center position is determined, so that the influence of eyebrow on human eye can be avoided, the accuracy of the acquired main eye can be improved, and the accuracy of photographing control can be improved. Moreover, in the process of determining the action of the main eye in this embodiment, the processor can only process the image in the rectangular frame corresponding to the main eye, which can reduce the amount of calculation and improve the real-time performance of the detection of the main eye.

The "device", "module" and the like in various embodiments of the present disclosure may be implemented by hardware units, software units, or combinations thereof. Examples of hardware units may include devices, components, processors, microprocessors, circuits, circuit elements (e.g., transistors, resistors, capacitors, inductors, etc.), integrated circuits, application specific integrated circuits (ASIC), programmable logic devices (PLD), digital signal processors (DSP), field programmable gate arrays (FPGA), memory units, logic gates, registers, semiconductor devices, chips, microchips, chipsets, etc. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, calculation code, computer code, code segments, computer code segments, words, values, symbols, or any combination thereof. Determining whether an embodiment is implemented by hardware units and/or software units may vary depending on any number of factors, such as desired calculation rate, power level, heat resistance, processing cycle budget, input data rate, output data rate, memory resources, data bus speed, and other design or performance constraints, as desired for a given implementation.

Some embodiments may include articles of manufacture. The article of manufacture may include a storage medium for storing logic. Examples of storage media may include one or more types of computer readable storage media capable of storing electronic data, including volatile or nonvolatile memory, removable or non-removable memory, erasable or non-erasable memory, writable or re-writable memory, and the like. Examples of logic may include various software elements such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, etc. The executable computer program instructions may be implemented in a predefined computer language, manner, or syntax for instructing the computer to perform certain functions. The instructions may be implemented using any suitable high-level, low-level, object-oriented, visual, compiled, and/or interpreted programming language.

Some embodiments may be described by the expression "an embodiment" or "some embodiments" along with their derivatives. These terms mean that a particular feature, structure, or characteristic described in connection with an embodiment is included in at least one embodiment. The phrase "in one embodiment" appearing in various places in the application does not necessarily all refer to the same embodiment.

However, it should be understood that although various features and beneficial effects of the present disclosure as well as specific details of the structure and function of the present disclosure have been set forth in the above description, these are merely exemplary, and the specific details, especially the shape, size, number and arrangement of components, may be specifically changed to the overall scope indicated by the broad general meaning claimed in the claims of the present disclosure within the scope of the principles of the present disclosure.

The words "a" or "an" in the claims of this disclosure do not exclude the plural, but are only intended for convenience of description and should not be construed as limiting the scope of protection of this disclosure. In the present disclosure, the terms "first" and "second" are used for descriptive purposes only and are not to be understood as indicating or implying relative importance, nor are they necessarily used to describe a sequential order or a temporal order. The term "plurality" refers to two or more than two, unless otherwise explicitly defined. Unless otherwise defined, all technical and scientific terms used in this specification have the same meaning as commonly understood by one of ordinary skill in the art to which this disclosure belongs.

Those skilled in the art will understand the term "substantially" herein, such as in "substantially all light" or "consisting essentially of". The term "substantially" may also include embodiments having "entirely," "completely," "all," etc. Therefore, in the embodiment, the adjective is also basically removable. Where applicable, the term "substantially" may also refer to 90% or more, such as 95% or more, particularly 99% or more, even more particularly 99.5% or more, including 100%. The term "comprising" also includes embodiments in which the term "comprising" means "consisting of". The term "and/or" specifically refers to one or more of the items mentioned before and after "and/or". For example, the phrase "item 1 and/or item 2" and similar phrases may refer to one or more of item 1 and item 2. The term "comprising" may refer to "consisting of" in one embodiment, but may also refer to "including at least the defined species and optionally one or more other species" in another embodiment. "Up", "Down", "Left" and "Right" are only used to indicate relative positional relationship, which may also change accordingly when the absolute position of the described object changes.

Other embodiments of the disclosure will readily occur to those skilled in the art after considering the specification and practicing the disclosure disclosed herein. The present disclosure is intended to cover any variations, uses, or adaptations of the present disclosure that follow the general principles of the present disclosure and include common knowledge or conventional technical means in the technical field not disclosed by the present disclosure. The specification and examples are to be regarded as exemplary only, with the true scope and spirit of the invention being indicated by the appended claims.

It should be understood that the present disclosure is not limited to the precise structure already described above and shown in the drawings, and various modifications and changes may be made without departing from its scope. The scope of the present disclosure is limited only by the appended claims.

The invention claimed is:

1. A self-photographing control method, comprising:
acquiring a first original image;
selecting a human eye from the first original image as a main eye for controlling photographing;
acquiring an action of the main eye; and
triggering a photographing operation when the action of the main eye meets a set condition,
wherein acquiring the action of the main eye comprises:
acquiring a plurality of second original images, wherein the plurality of second original images are images captured sequentially after the first original image;
for each second original image in the plurality of second original images, acquiring an area of a connected domain in a rectangular frame corresponding to the main eye in each second original image, wherein the rectangular frame corresponding to the main eye in each second original image is a rectangular frame generated with a set size based on a respective center position of each main eye;
determining that the main eye is in a closed state when the area of the connected domain in the rectangular frame corresponding to the main eye is less than or equal to an area threshold; and
based on the closed state of the main eye in the plurality of second original images, determining closing time of the main eye or the closing times of the main eye in a set time period to obtain the action of the main eye.

2. The self-photographing control method according to claim 1, wherein selecting the human eye from the first original image as the main eye for controlling photographing comprises:
processing the first original image to obtain at least one human face image;
processing the at least one human face image to obtain at least one human eye image; and
selecting a human eye from the at least one human eye image as the main eye.

3. The self-photographing control method according to claim 2, wherein processing the at least one human face image to obtain the at least one human eye image comprises:
performing a first preprocessing on each human face image in the at least one human face image, wherein the first preprocessing comprises grayscale processing and normalization processing;
determining a respective center position of each human eye by an integral projection operation and a differential projection operation for each human face image after the first preprocessing; and
generating a rectangular frame with a set size based on the respective center position of each human eye, wherein an image in the rectangular frame comprises the human eye image.

4. The self-photographing control method according to claim 3, wherein determining the center position of each human eye by the integral projection operation and the differential projection operation for each human face image after the first preprocessing comprises:
determining an abscissa of the center position of the human eye in the human eye image by a vertical integral projection operation;

determining an iris region of the human eye in the human eye image by a horizontal differential projection operation; and determining an ordinate of a line with a smallest sum of gray values of an image in the iris region by a horizontal integral projection operation to obtain an ordinate of the center position of the human eye.

5. The self-photographing control method according to claim 3, wherein selecting the human eye from the at least one human eye image as the main eye comprises:

determining a number of the at least one human eye image;

when the number of the at least one human eye image is multiple, performing a second preprocessing on the image in the rectangular frame, wherein the second preprocessing comprises at least binarization processing, corrosion processing and dilation processing;

acquiring an area of a connected domain in each rectangular frame;

adopting a human eye in the rectangular frame corresponding to the connected domain with a largest area as the main eye; and when the number of the at least one human eye image is one, adopting a human eye in the rectangular frame as the main eye.

6. The self-photographing control method according to claim 1, wherein before acquiring the area of the connected domain in the rectangular frame corresponding to the main eye in each second original image, the method further comprises:

acquiring a center position of the human eye in the rectangular frame in each second original image; and when a distance between the center position of the human eye in each second original image and the center position of the main eye is less than or equal to a distance threshold, adopting the human eye in each second original image as the main eye.

7. The self-photographing control method according to claim 1, wherein the set condition comprises a number of closing times of the main eye in the set time period exceeding a set number of the closing times.

8. The self-photographing control method according to claim 1, wherein the set condition comprises a closing time of the main eye exceeding a closing time threshold.

9. An electronic device comprising:
a camera circuit;
a processor; and
a memory for storing executable instructions and files of the processor,
wherein the processor is configured to execute the executable instructions in the memory to implement operations in the method of claim 1.

10. A non-transitory computer storage medium storing thereon executable instructions executable by a processor of a computer, wherein when the executable instructions are executed by the processor of the computer, operations in the method of claim 1 are implemented.

11. A self-photographing control device, comprising:
a first image acquisition circuit configured to acquire a first original image;
a main eye selection circuit configured to select a human eye from the first original image as a main eye for controlling photographing;
an action acquisition circuit configured to acquire an action of the main eye; and a photographing trigger circuit configured to trigger photographing operation when the action of the main eye meets a set condition, wherein the action acquisition circuit comprises:
an image acquisition subcircuit configured to acquire a plurality of second original images, wherein the plurality of second original images are images captured sequentially after the first original image;

a connected domain area acquisition subcircuit configured to acquire an area of a connected domain in a rectangular frame corresponding to the main eye in each second original image for each second original image in the plurality of second original images, wherein the rectangular frame corresponding to the main eye in each second original image is a rectangular frame generated with a set size based on a respective center position of each main eye;

a main eye state determination subcircuit configured to determine that the main eye is in a closed state when the area of the connected domain in the rectangular frame corresponding to the main eye is less than or equal to an area threshold; and a main eye action acquisition subcircuit configured to determine closing time of the main eye or closing times of the main eye within a set time period based on the closed state of the main eye in the plurality of second original images to obtain the action of the main eye.

12. The self-photographing control device according to claim 11, wherein the main eye selection circuit comprises:
a human face image acquisition subcircuit configured to process the first original image to obtain at least one human face image;
a human eye image acquisition subcircuit configured to process the at least one human face image to obtain at least one human eye image; and
a main eye selection subcircuit configured to select a human eye from the at least one human eye image as the main eye.

13. The self-photographing control device according to claim 12, wherein the human eye image acquisition subcircuit comprises:
a first preprocessing unit configured to perform a first preprocessing for each human face image in the at least one human face image, the first preprocessing comprising grayscale processing and normalization processing;
a human eye center determination unit configured to determine a respective center position of each human eye by an integral projection operation and a differential projection operation for each human face image after the first preprocessing; and
a human eye image acquisition unit configured to generate a rectangular frame with a set size based on the respective center position of each human eye, wherein an image in the rectangular frame is a human eye image.

14. The self-photographing control device according to claim 13, wherein the human eye center determination unit comprises:
an abscissa determination subunit configured to determine an abscissa of the center position of the human eye in the human eye image by a vertical integral projection operation;
an iris region determination subunit configured to determine an iris region of a human eye in the human eye image by a horizontal differential projection operation; and an ordinate determination subunit configured to determine an ordinate of a line with a smallest sum of gray values of an image in the iris region by a horizontal integral projection operation to obtain an ordinate of the center position of the human eye.

15. The self-photographing control device according to claim 13, wherein the main eye selection subcircuit comprises:
   a human eye number determination unit configured to determine a number of the at least one human eye image;
   a second preprocessing unit configured to perform a second preprocessing on the image in the rectangular frame when the number of the at least one human eye image is multiple, wherein the second preprocessing comprises at least binarization processing, corrosion processing and dilation processing;
   a connected domain area acquisition unit configured to acquire an area of a connected domain in each rectangular frame; and
   a main eye determination unit configured to adopt a human eye in the rectangular frame corresponding to the connected domain with a largest area as the main eye, and also configured to adopt a human eye in the rectangular frame as the main eye when an image number of the at least one human eye is one.

16. The self-photographing control device according to claim 11, further comprising:
   a human eye center determination circuit configured to acquire a center position of the human eye in the rectangular frame in each second original image; and
   a main eye determination circuit configured to determine that a human eye in each second original image is the main eye when a distance between the center position of the human eye in each second original image and the center position of the main eye is less than or equal to a distance threshold.

17. The self-photographing control device according to claim 11, wherein the set condition comprises a number of times the main eye is closed exceeding a set number of times within a set time period, or the closing time of the main eye exceeding a closing time threshold.

* * * * *